United States Patent
Savanth et al.

(10) Patent No.: US 12,393,250 B2
(45) Date of Patent: Aug. 19, 2025

(54) METHOD AND APPARATUS FOR INSTRUCTION CHECKPOINTING IN A DATA PROCESSING DEVICE POWERED BY AN UNPREDICTABLE POWER SOURCE

(71) Applicants: ARM LIMITED, Cambridgeshire (GB); UNIVERSITY OF SOUTHAMPTON, Southampton (GB)

(72) Inventors: Parameshwarappa Anand Kumar Savanth, Cambridgeshire (GB); Alexander Stewart Weddell, Southampton (GB); Matthew James Walker, Cambridgeshire (GB); Wei Wang, Cambridgeshire (GB); James Edward Myers, Cambridgeshire (GB)

(73) Assignees: ARM LIMITED, Cambridge (GB); UNIVERSITY OF SOUTHAMPTON, Southampton (GB)

( * ) Notice: Subject to any disclaimer, the term of this patent is extended or adjusted under 35 U.S.C. 154(b) by 340 days.

(21) Appl. No.: 17/760,190

(22) PCT Filed: Feb. 8, 2021

(86) PCT No.: PCT/GB2021/050274
§ 371 (c)(1),
(2) Date: Aug. 5, 2022

(87) PCT Pub. No.: WO2021/160994
PCT Pub. Date: Aug. 19, 2021

(65) Prior Publication Data
US 2023/0046064 A1 Feb. 16, 2023

(30) Foreign Application Priority Data
Feb. 10, 2020 (GB) .................................... 2001782

(51) Int. Cl.
*G06F 1/3228* (2019.01)
*G06F 1/30* (2006.01)
(Continued)

(52) U.S. Cl.
CPC .......... *G06F 1/3228* (2013.01); *G06F 1/3212* (2013.01); *G06F 1/3296* (2013.01);
(Continued)

(58) Field of Classification Search
CPC ........ G06F 1/30; G06F 1/3228; G06F 1/3296; G06F 11/1407; G06F 11/3058; G06F 8/4432; G06F 1/3212; Y02D 10/00
See application file for complete search history.

(56) References Cited

U.S. PATENT DOCUMENTS

| | | | |
|---|---|---|---|
| 9,684,563 B1 * | 6/2017 | Wartnick | G06F 11/1458 |
| 2005/0198450 A1 * | 9/2005 | Corrado | G06F 3/0613 |
| | | | 711/114 |

(Continued)

OTHER PUBLICATIONS

Chen Pan, et al., "A lightweight progress maximization scheduler for non-volatile processor under unstable energy harvesting", Languages, Compilers, and Tools for Embedded Systems, ACM, 2 Penn Plaza, Suite 701 New York NY10121-0701 USA, Jun. 21, 2017 (Jun. 21, 2017), pp. 101-110, XP058368957, DOI: 10.1145/3078633. 3081038 ISBN: 978-1-4503-5030-3; section 3.2; section 5.

(Continued)

*Primary Examiner* — Terrell S Johnson
(74) *Attorney, Agent, or Firm* — NIXON & VANDERHYE P.C.

(57) ABSTRACT

A method and apparatus generate computer executable code as one or more code portions, detect a number of processing operations required to reach one or more predetermined stages in execution of each code portion, and associate with each code portion one or more progress indicators, each representing a respective execution stage of the one or more (Continued)

predetermined stages within execution of that code portion. Further aspects include, when a current execution stage of the program code is at least at the execution stage represented by the progress indicator, a first operation may be performed, and when the current execution stage of the program code is before the execution stage represented by the progress indicator, a second operation different from the first operation is performed.

9 Claims, 7 Drawing Sheets

(51) Int. Cl.
G06F 1/3212 (2019.01)
G06F 1/3296 (2019.01)
G06F 8/41 (2018.01)
G06F 11/14 (2006.01)
G06F 11/30 (2006.01)

(52) U.S. Cl.
CPC .............. G06F 1/30 (2013.01); G06F 8/4432 (2013.01); G06F 11/1407 (2013.01); G06F 11/3058 (2013.01); Y02D 10/00 (2018.01)

(56) References Cited

U.S. PATENT DOCUMENTS

2013/0151882 A1 6/2013 Yamauchi et al.
2017/0343987 A1* 11/2017 Jayakumar .......... G06F 11/3013
2018/0340982 A1* 11/2018 Kohtz ................. G06F 11/3089
2019/0018739 A1 1/2019 Hashimoto

OTHER PUBLICATIONS

Mirhoseini Azalia, et al., "Automated checkpointing for enabling intensive applications on energy harvesting devices", International Symposium on Low Power Electronics and Design (ISLPED), IEEE, Sep. 4, 2013 (Sep. 4, 2013), pp. 27-32, XP032502360, DOI: 10.1109/ISLPED.2013.6629262; [retrieved on Oct. 10, 2013] section III.A section 111.B section 111.C.
Josiah Hester and Jacob Sorber, "New Directions: The Future of Sensing is Batteryless, Intermittent, and Awesome", In Proceedings of SenSys '17, Delft, Netherlands, Nov. 6-8, 2017, 6 pages. DOI: 10.1145/3131672.3131699, 2017.
Kiwan Maeng, Alexei Colin, and Brandon Lucia, "Alpaca: Intermittent Execution without Checkpoints", Proc. ACM Program. Lang. 1, OOPSLA, Article 96 (Oct. 2017), 29 pages.
Colin, et al., "Chain: Tasks and Channels for Reliable Intermittent Programs", Carnegie Mellon University, USA, Oct. 19, 2016.
Alexei Colin, Emily Ruppel, and Brandon Lucia, "A Reconfigurable Energy Storage Architecture for Energy-harvesting Devices", In ASPLOS '18: 2018 Architectural Support for Programming Languages and Operating Systems, Mar. 24-28, 2018, Williamsburg, VA, USA. ACM, New York, NY, USA, 15 pages. https://doi.org/10.1145/3173162.3173210; 2018.
Buettner, et al., "Dewdrop: An Energy-Aware Runtime for Computational RFID", University of Washingtonand Intel Labs Seattle, Mar. 30, 2011.
Balsamo, et al., "Hibernus: Sustaining Computation during Intermittent Supply for Energy-Harvesting Systems", 2014 IEEE.
Ransford, et al., "Mementos: System Support for Long-Running Computation on RFID-Scale Devices", ASPLOS'11, Mar. 5-11, 2011, Newport Beach, California, USA. Copyright 2011 ACM 978-1-4503-0266-1/11/03.
Jayakumar, et al., "Quickrecall: A Low Overhead HW/SW Approach for Enabling Computations across Power Cycles in Transiently Powered Computers", 1063-9667/14, 2014, IEEE DOI 10.1109/VLSID.2014.63.
Balsamo, et al., "Hibernus++: A Self-Calibrating and Adaptive System for Transiently-Powered Embedded Devices", Copyright 2015 IEEE.

* cited by examiner

METHOD AND APPARATUS FOR INSTRUCTION CHECKPOINTING IN A DATA PROCESSING DEVICE POWERED BY AN UNPREDICTABLE POWER SOURCE

BACKGROUND

This disclosure relates to apparatus and methods.

Some data processing devices or apparatus are powered by power sources which can be intermitted or at least unpredictable. For example, many so-called smart devices containing processors may be powered by stored energy obtained by an energy harvester such as an induction coil or loop (which depends on proximity to a power source) or a solar generator.

It is possible that during execution of program code by such a processor, the reserve of stored energy in the energy storage becomes exhausted. This can lead to unpredictable behaviour by the processor and/or to the waste of processing effort for code already executed at the time that the operating power to the processor is lost.

SUMMARY

In an example arrangement there is provided a computer-implemented method comprising:

generating computer executable code as one or more code portions;

detecting a number of processing operations required to reach one or more predetermined stages in execution of each code portion; and associating with each code portion one or more progress indicators, each representing a respective execution stage of the one or more predetermined stages within execution of that code portion.

In another example arrangement there is provided a method comprising:

executing program code having at least one associated progress indicator, each representing a respective execution stage within execution of that code portion;

detecting an energy condition indicating that no more than a reserve quantity of electrical energy is available to a processor configured to execute the program code;

when the energy condition is detected:
  detecting whether the execution of the program code has reached at least the execution stage represented by the progress indicator;
  when a current execution stage of the program code is at least at the execution stage represented by the progress indicator, performing a first operation; and
  when the current execution stage of the program code is before the execution stage represented by the progress indicator, performing a second operation different to the first operation.

In another example arrangement there is provided apparatus comprising:

a processor to execute program code having one or more associated progress indicators, each representing a respective execution stage within execution of that code portion;

an energy store to provide operating power to the processor;

an energy condition detector to detect an energy condition indicating that no more than a reserve quantity of electrical energy is available in the energy store;

control circuitry, responsive to a detection of the energy condition, the control circuitry comprising an execution stage detector to detect whether a current execution stage of the program code has reached at least the execution stage represented by the progress indicator;

the control circuitry being configured, when the current execution stage of the program code is at least at the execution stage represented by the progress indicator, to control performance of a first operation; and when the current execution stage of the program code is before the execution stage represented by the progress indicator, to control performance of a second operation different to the first operation.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
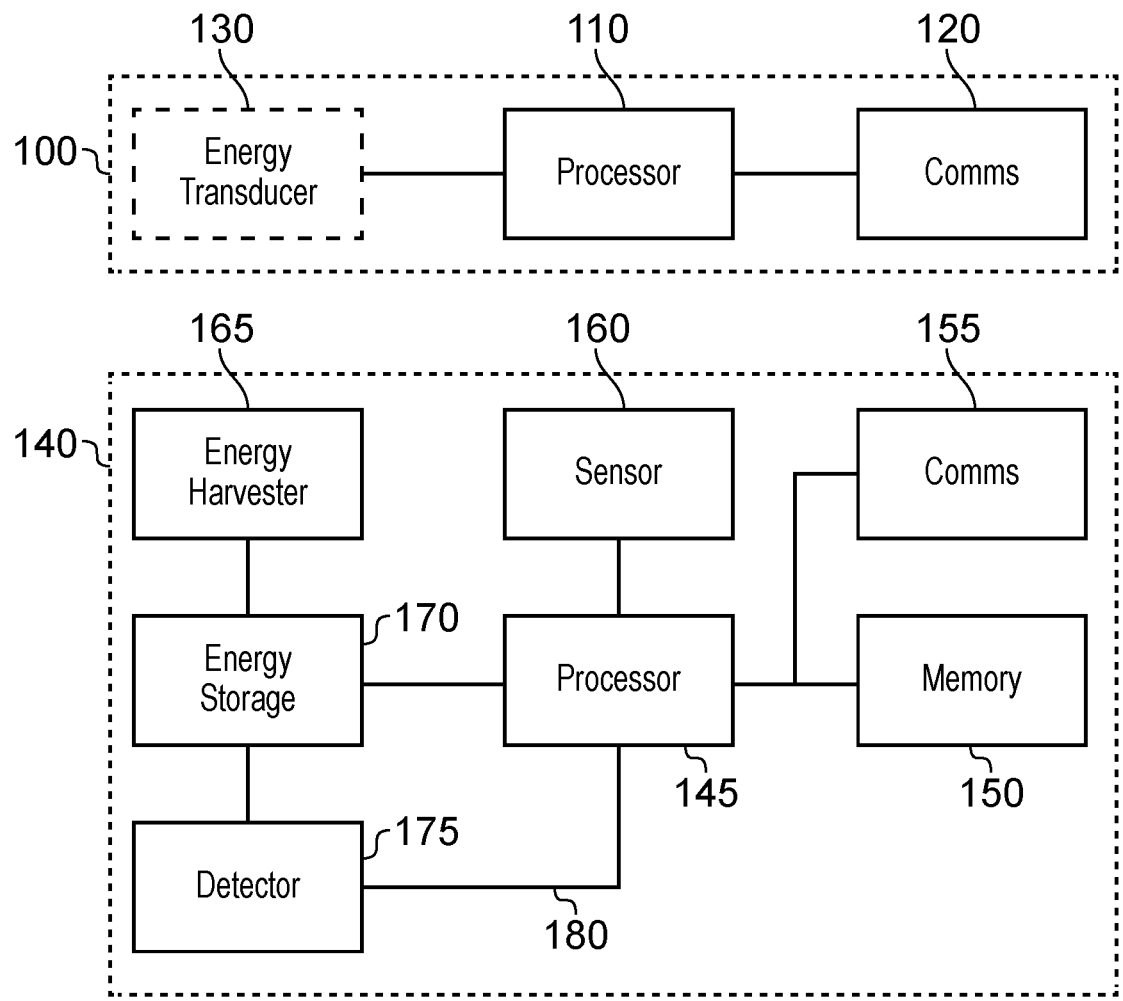
FIG. 1 schematically illustrates an example apparatus.

Before discussing the embodiments with reference to the accompanying figures, the following description of embodiments is provided.

An example embodiment provides a computer-implemented method comprising:

generating computer executable code as one or more code portions;

detecting a number of processing operations required to reach one or more predetermined stages in execution of each code portion; and associating with each code portion one or more progress indicators, each representing a respective execution stage of the one or more predetermined stages within execution of that code portion.

The present disclosure provides techniques for handling, for example, power interruptions within execution of program code, by providing one or more progress indicators against which the current execution stage can be compared, for example when an imminent power loss is detected, and appropriate actions taken.

A convenient way of formatting or expressing a progress indicator is one in which a progress indicator of the one or more progress indicators represents a respective execution stage within execution of that code portion as a number of processing operations already executed during execution of that code portion.

In some examples, a progress indicator of the one or more progress indicators represents a respective execution stage at which no more than a threshold remaining number of processing operations are required to complete execution of that code portion. Such a progress indicator allows a processor running such code to determine to continue executing the code notwithstanding an imminent loss of power, for example when a reserve amount of power is sufficient to execute the remaining number of processing operations. In such an arrangement the associating step may be responsive to data indicating a reserve number of processing operations which can be executed using an electrical energy reserve available to a processor configured to execute the code portion, the threshold remaining number of processing operations being no greater than the reserve number of processing operations.

A convenient way of generating the code is one in which the generating step comprises compiling computer source code into two or more code portions.

The present techniques can work well with static checkpointing, for example in a method comprising providing, as a final processing stage of at least some of the code portions, checkpoint data storage code configured to store at least one or more data values generated by that code portion; and providing, as an initial processing stage of at least some of the code portions, checkpoint data retrieval code configured to retrieve at least one or more data values generated by a preceding code portion.

Another example (which can be used instead of or in addition to the example just discussed) is one in which a progress indicator of the one or more progress indicators represents a respective execution stage within execution of that code portion after which a processor executing that code portion should save a current state (for example one or both of data indicative of a current processor state and data indicative of a current memory state (or parts of a memory state such as data representing certain variables), for example of an overall processing system including the processor and/or of memory accessed by the processor) in response to an interruption of power supply to the processor.

The present techniques may conveniently be implemented using computer software which, when executed by a computer, causes the computer to perform the method discussed above. The computer software may be provided by a non-transitory machine-readable storage medium which stores such computer software.

Another example embodiment provides a method comprising:

executing program code having at least one associated progress indicator, each representing a respective execution stage within execution of that code portion;

detecting an energy condition indicating that no more than a reserve quantity of electrical energy is available to a processor configured to execute the program code;

when the energy condition is detected:

detecting whether the execution of the program code has reached at least the execution stage represented by the progress indicator;

when a current execution stage of the program code is at least at the execution stage represented by the progress indicator, performing a first operation; and when the current execution stage of the program code is before the execution stage represented by the progress indicator, performing a second operation different to the first operation.

In these example embodiments, the progress indicator is used so that an energy condition is handled differently depending upon whether execution has reached a stage indicated by a progress indicator.

In some examples, a first progress indicator of the one or more progress indicators represents an execution stage at which no more than a threshold remaining number of processing operations are required to complete execution of that code portion; and the first operation comprises continuing execution of the program code using the reserve quantity of electrical energy. This avoids unnecessary use of checkpointing if the processor is in fact able to continue the remaining execution of the code in question.

In some examples, the program code may have two or more associated progress indicators; a second progress indicator of the two or more progress indicators represents a further execution stage within execution of the program code; and when the current execution stage of the program code is at least at the further execution stage, the second operation comprises saving a current state, and when the current execution stage of the program code is before the further execution stage, the second operation comprises terminating execution of the program code. This arrangement allows various different outcomes depending on the progress of execution at the time of an energy condition being detected.

For convenience, the step of detecting an energy condition may comprise one or more selected from the list consisting of:

comparing a prevailing output voltage of an energy storage device with a predetermined threshold voltage; and detecting a voltage decay characteristic of the energy storage device, generating a reference threshold voltage, and comparing the prevailing output voltage of an energy storage device with the generated reference threshold voltage.

This allows either a predetermined or an adaptive threshold to be used.

In some example the method comprises detecting, during an instance of execution of the program code, the execution stage at which no more than a threshold remaining number of processing operations are required to complete execution of that code portion, and/or detecting a voltage decay characteristic of the energy storage device; and in response to the detection, generating and/or modifying at least the first progress indicator for use in subsequent instances of execution of the program code.

This allows either a predetermined or an adaptive progress indicator to be used.

Another example embodiment provides apparatus comprising:

a processor to execute program code having one or more associated progress indicators, each representing a respective execution stage within execution of that code portion;

an energy store to provide operating power to the processor;

an energy condition detector to detect an energy condition indicating that no more than a reserve quantity of electrical energy is available in the energy store;

control circuitry, responsive to a detection of the energy condition, the control circuitry comprising an execution stage detector to detect whether a current execution stage of the program code has reached at least the execution stage represented by the progress indicator;

the control circuitry being configured, when the current execution stage of the program code is at least at the execution stage represented by the progress indicator, to control performance of a first operation; and when the current execution stage of the program code is before the execution stage represented by the progress indicator, to control performance of a second operation different to the first operation.

Again, the energy condition detector may comprise a comparator to compare a current output voltage of the energy store with a reference and/or threshold voltage.

A possible underlying reason why energy conditions are detectable is that the apparatus may comprise energy harvesting apparatus to provide electrical energy to the energy store, in which the energy harvesting apparatus comprises one or more selected from the list consisting of:

(i) induction circuitry to receive electrical energy from an external induction apparatus;

(ii) vibrational generator circuitry to generate electrical energy from mechanical vibrations of at least the vibrational generator circuitry;

(iii) thermal generator circuitry to generate electrical energy from a temperature gradient associated with at least the thermal generator circuitry; and (iv) solar generator circuitry to generate electrical energy from light incident on at least the solar generator circuitry.

In order to initiate handling of the energy condition in accordance with the progress indicator(s), the energy condition detector may comprise interrupt circuitry to provide a processor interrupt to the processor.

In some examples, as discussed above, a first progress indicator of the one or more progress indicators represents an execution stage at which no more than a threshold remaining number of processing operations are required to complete execution of that code portion; and the first operation comprises continuing execution of the program code using the reserve quantity of electrical energy. in some examples, as discussed above, the program code has two or more associated progress indicators; a second progress indicator of the two or more progress indicators represents a further execution stage within execution of the program code; and when the current execution stage of the program code is at least at the further execution stage, the second operation comprises saving a current state, and when the current execution stage of the program code is before the further execution stage, the second operation comprises terminating execution of the program code.

The present techniques are compatible with static checkpointing, for example in which the program code comprises a respective code portion of a set of two or more code portions (generated at compilation of source code for example), in which: a final processing stage of at least some of the code portions comprises checkpoint data storage code configured to store at least one or more data values generated by that code portion; and an initial processing stage of at least some of the code portions comprises checkpoint data retrieval code configured to retrieve at least one or more data values generated by a preceding code portion.

The present techniques are particularly useful in the context of an apparatus having one or more sensors to provide input data for processing by the processor using the program code; and communication circuitry to communicate an output of the execution of the program code by the processor to external apparatus.

Overview of Apparatus

FIG. 1 schematically illustrates a data processing system comprising a base apparatus 100 and a so-called smart device 140. In operation, the base apparatus 100 interacts with, and may provide operating power to, the smart device 140. The smart device may provide the functionality of, for example, a sensor arrangement or a secure identification arrangement such as a so-called smart card or a credit card. Further examples will be discussed below.

Note that although the operations of the system of FIG. 1 are described in terms of the two devices interacting with one another, note that the actual performance of the present disclosure by the device 140 is not in fact dependent upon a proximity of a base apparatus or even upon a substantive interaction with a base apparatus.

The base apparatus comprises a processor 110, a communications interface 120 and an optional energy transducer 130.

Typically, communications between a base apparatus and a smart device of the types shown here is by radio frequency (RF) communication, for example, via one or more induction coils, loops or antennas on the base apparatus and the smart device which interact to provide wireless communication. So, the communications unit 120 may comprise such an antenna or induction coil or loop.

The energy transducer 130 typically can provide operating power to the device 140 by electromagnetic induction and so may also comprise an induction coil or loop or the like. It is shown in broken line because (a) in some examples, the functionality of the communications interface and the energy transducer may be provided by a common induction coil or loop—in other examples, these arrangements may be separate; and (b) in further examples, there may in fact be no need for an energy transducer 130 at the base apparatus 100 and instead energy or operation of the smart device 140 may be obtained or "harvested" from other sources such as solar generation from incident light.

Turning to the smart device 140, this comprises a processor 145, a memory 150, communications circuitry 155, for example to communicate an output of the execution of the program code by the processor to external apparatus, (at least in some examples) a sensor 160 such as a temperature sensor, an energy sensor 165, energy storage 170 and a detector 175, for example to provide input data for processing by the processor using the program code.

In operation, the processor 145 executes program code stored by the memory 150 and communicates with the base apparatus by an interaction between the communications circuitry 155 of the smart device and the communications circuitry 120 of the base apparatus. For example, in the case that the sensor 160 is provided, the processor 145 can perform one or more operations on data received from the sensor 160 using program code stored in the memory 150 and provide the processed output data to the base apparatus via the interaction of the communications unit 155, 120.

The processor 145 is powered in operation by the energy storage device 170 which in turn is provided with electrical energy by the energy harvester 165. As mentioned above, in some examples, the energy harvester 165 may comprise an induction coil or loop which interacts with the energy transducer 130 of the base apparatus so as to receive electrical power from the base apparatus. However, this use of induction circuitry to receive electrical energy from the external induction apparatus 130 is just one example of an energy harvester 165. Other examples may include one or more of: vibrational generational circuitry to generate electrical energy from mechanical vibrations of the smart device 140 or at least of the vibrational generators circuitry; thermal generator circuitry to generate electrical energy from a temperature gradient associated with at least the thermal generator circuitry; and solar generator circuitry to generate electrical energy from light incident on at least the solar generator circuitry. For example, if the smart device 140 is mounted on a hot apparatus such as an engine casing, an exhaust manifold or the like, a temperate gradient between a surface of the smart device which contacts the hot apparatus and another surface of the smart device 140 which is exposed to a cooling fluid such as air (for example via a heatsink) can provide a generation of electrical energy, for example by a module using the so-called Peltier effect.

Electrical energy provided by the energy harvester 165 is stored by the energy storage 170 which may comprise a rechargeable battery or cell or a capacitor or the like. The energy storage 170 therefore stores a quantity of electrical energy which it uses (while that quantity lasts) in order to provide operating power to the processor 145 and optionally other components of the smart device 140.

In some example instances, the supply of energy from the energy harvester 165 to the energy storage 170 is somewhat intermittent or at least unpredictable. In the case of an induction system, the supply of energy may depend upon the prevailing proximity of the smart device 140 to the base apparatus 100. In the case of vibrational generation, the supply of energy depends upon the prevailing vibrational state of the smart device or at least the energy harvester 165. In the case of thermal generation, the supply of energy depends on the prevailing temperate gradient. In the case of solar generation, the supply of energy depends on the prevailing incident light.

Therefore, circumstances can arise in which the energy storage 170 simply runs out of stored energy, which may happen part-way through the execution of program code of the processor 145. If this is allowed to happen at any arbitrary stage of the processing of the program code, it could lead to unpredictable or unreliable outcomes in terms of the data to be processed and delivered to the base apparatus 100.

Therefore, in at least some examples, a detector 175 is provided. This can detect an energy condition indicating that no more than a reserved quantity of electrical energy is available to the processor 145, for example by using a comparator to compare a prevailing output voltage of the energy storage 170 with a reference and/or threshold voltage. This is based upon the assumption and empirical finding that the established relationship between remaining stored energy in an energy storage device of the type discussed above and prevailing output voltage is such that the prevailing output voltage tends to decrease or droop as the stored energy heads towards exhaustion. By using the mapping between output voltage and stored energy, a threshold voltage can be employed at the detector 175 so that the energy condition is detected and signalled 180 to the processor 145 when the electrical energy reserve available to the processor 145 to execute program code is such that it provides a particular reserve number of processing operations (such as processor cycles) which can still be executed using the electrical energy reserve.

In other words, the energy condition can be flagged 180 to the processor 145 at a stage in the depletion of the energy storage 170 at which at least some stored energy remains so that any steps to be taken by the processor 145 to deal with the imminent loss of electrical power can be initiated so as to allow a controlled "soft" or graceful termination of the current processing task using the remaining execution cycles. In some examples, the detector 175 comprises interrupt circuitry to provide (as an indication of the energy condition being detected) a processor interrupt to the processor 145.

The energy condition may therefore indicate that a reserve number of processing operations (for examples, processor cycles) are available and can still be executed using an electrical energy reserve available to a processor such as the processor 145 configured to execute a current code portion.

Code Portions (Division into Tasks)

Figure 2:
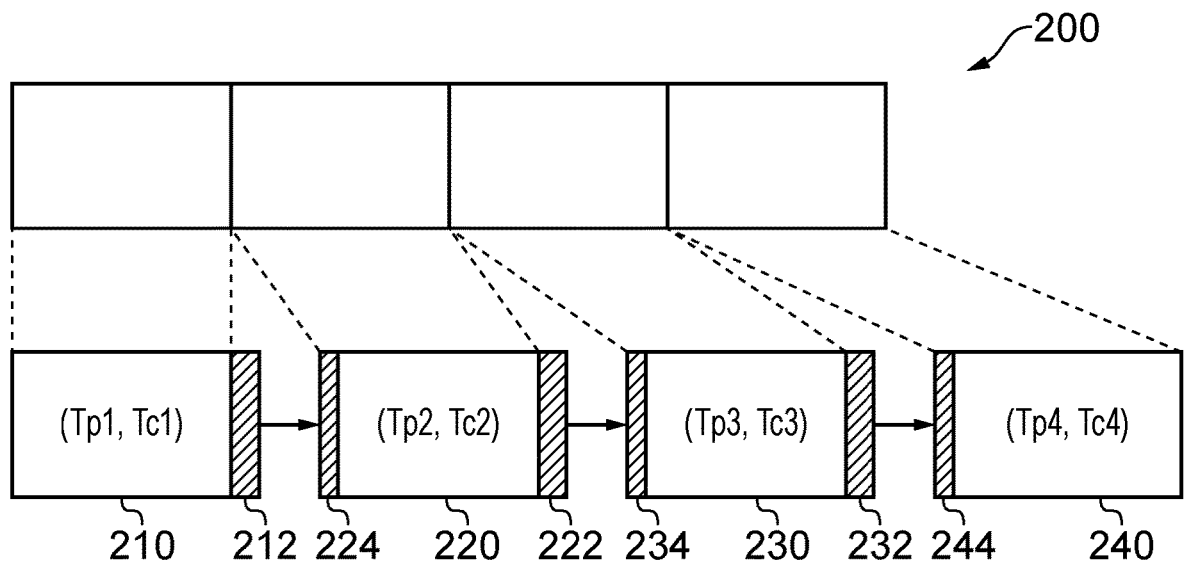
FIG. 2 schematically illustrates a set of code portions.

One possible way to address the feature of limited electrical energy in the apparatus as described above is to generate and execute program code in the smart device as a set of code "portions" representing respective tasks. FIG. 2 schematically illustrates a set of code portions 200 in which each portion 210, 220, 230, 240 is independently executable, and the execution of the four example portions as shown, in the order shown, provides the whole of the required functionality of the program code.

Checkpointing

A technique illustrated in FIG. 2 is so-called checkpointing which involves providing, as a final processing stage 212, 222, 232 of at least some of the code portions, checkpoint data storage code configured to store (for example in a non-volatile storage such as at least a portion of the memory 150) at least one or more data values generated by that code portion, and to provide as an initial processing stage 224, 234, 244 of at least some of the code portions, checkpoint data retrieval code configured to retrieve at least one or more data values generated by a preceding code portion.

By way of contrast with ad hoc checkpoint code to be discussed below, note that the checkpoint code illustrated by FIG. 2 is provided, for example by the compiler, at predetermined positions (end and beginning) of the code portions.

As illustrated schematically in FIG. 2, in some example embodiments the first code portion 210 may not require the checkpoint data retrieval code and the last code portion may not require the checkpoint data storage code, given that there may be no preceding or subsequent code portion respectively.

The number of checkpoints needed in the arrangement of FIG. 2 has to be a balance between introducing inefficiencies in the execution of the overall program codes 200 (by the overhead of checkpointing and retrieving the checkpoint data) and avoiding undue losses of processed data if the electrical energy is exhausted many cycles after the previous checkpoint. In general terms, if there is an exhaustion of electrical energy between checkpoints, in the previously proposed arrangement of FIG. 2, processing which has been executed since the last checkpoint has to be discarded and the code portion restarted when electrical energy is restored.

Progress Indicators and Ad Hoc Checkpointing

Figure 3:
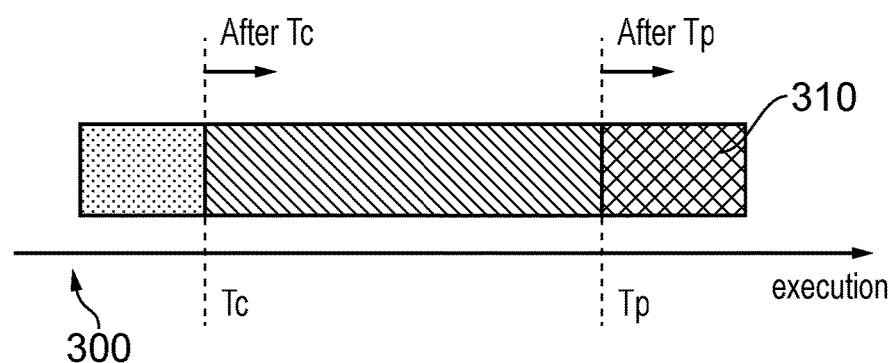
FIG. 3 schematically illustrates example progress indicators.

As a way of mitigating this problem, FIG. 3 schematically illustrates an example of so-called progress indicators.

In FIG. 3, execution of a code portion is shown running from left to right as drawn. Two so-called progress indicators are illustrated, namely $T_c$ and $T_p$. The first of these is a so-called checkpoint indicator $T_c$ and the other is a so-called push-through indicator $T_p$. They can be present individually (which is to say, one without the other) or in combination.

From the start 300 of execution, if the energy condition is detected before the execution stage represented by $T_c$, then execution of that code portion is terminated and any results discarded and (when power is restored) execution of the whole code portion is restarted. After the execution stage represented by $T_c$ if the energy condition is detected, it is considered worth invoking ad hoc (impromptu, performed for the particular purpose currently required rather than being pre-scheduled) checkpointing code to provide an intermediate checkpoint which can store at least one or more data values generated by execution so far of that code portion. In other words, $T_c$ may represent a respective execution stage within execution of that code portion after which a processor executing that code portion should save a current state in response to an interruption of power supply to the processor. In order to trigger retrieval of the ad hoc checkpoint data when the power is restored, the processor 145 can store (for example) a non-volatile flag to indicate the need to retrieve the checkpoint data. Either or both of the flag and the checkpoint data can indicate where in the code portion to restart execution.

In general terms, at least ad hoc checkpointing (or more generally, checkpointing) may be considered as storage of a current state, for example one or both of data indicative of a current processor state and data indicative of a current memory state (or parts of a memory state such as data representing certain variables), for example of an overall processing system including the processor and/or of memory accessed by the processor.

Once the execution stage represented by $T_p$ has been reached, it is in fact worth continuing execution (and not checkpointing) because sufficient electrical energy remains to execute the remaining portion 310 of the program code in that code portion.

So, in summary:
(a) if only $T_c$ is provided:
   energy condition occurs before $T_c$: discard (terminate) and restart
   energy condition occurs on or after $T_c$: ad hoc checkpoint
(b) if only $T_p$ is provided:
   energy condition occurs before $T_p$: discard and restart
   energy condition occurs on or after $T_p$: continue to completion (using reserve energy)
(c) if $T_c$ and $T_p$ are both provided:
   energy condition occurs before $T_c$: discard and restart
   energy condition occurs between $T_c$ and $T_p$: ad hoc checkpoint
   energy condition occurs on or after $T_p$: continue to completion These discussions assume that $T_c$ represents an execution stage before that represented by $T_p$.

In these examples, it is also assumed that $T_p$ represents an execution stage at which no more than a threshold remaining number of processing operations are required to complete execution of that code portion and also that the threshold remaining number of processing operations is no greater than the reserve number of processing operations (at which the energy condition is triggered).

It is also assumed that the ad hoc checkpoint code can be executed within the reserve number of processing operations (at which the energy condition is triggered). Note that this condition applies to the ad hoc checkpoint code used to save the checkpoint data; once power is restored there is no similar restriction on the ad hoc checkpoint retrieval code.

Note that the use of ad hoc checkpointing is considered in addition to the fixed checkpointing discussed above. However, the techniques would work and would be useful in the absence of either or both of (i) multiple code portions, and (ii) fixed checkpointing.

Instigation of Ad Hoc Checkpointing Code

A checkpoint save operation (for example, when the energy condition occurs between $T_c$ and $T_p$) can be instigated by, for example, interrupt handing code in response to checking one or more status indicators to be discussed below. The checkpoint save code can set a return indication which, when execution restarts, prompts a checkpoint retrieval operation and also indicates a position within the code to restart operation. For example, this information can be pushed to and popped from a stack or similar storage location.

Compilation Process

Figure 4:
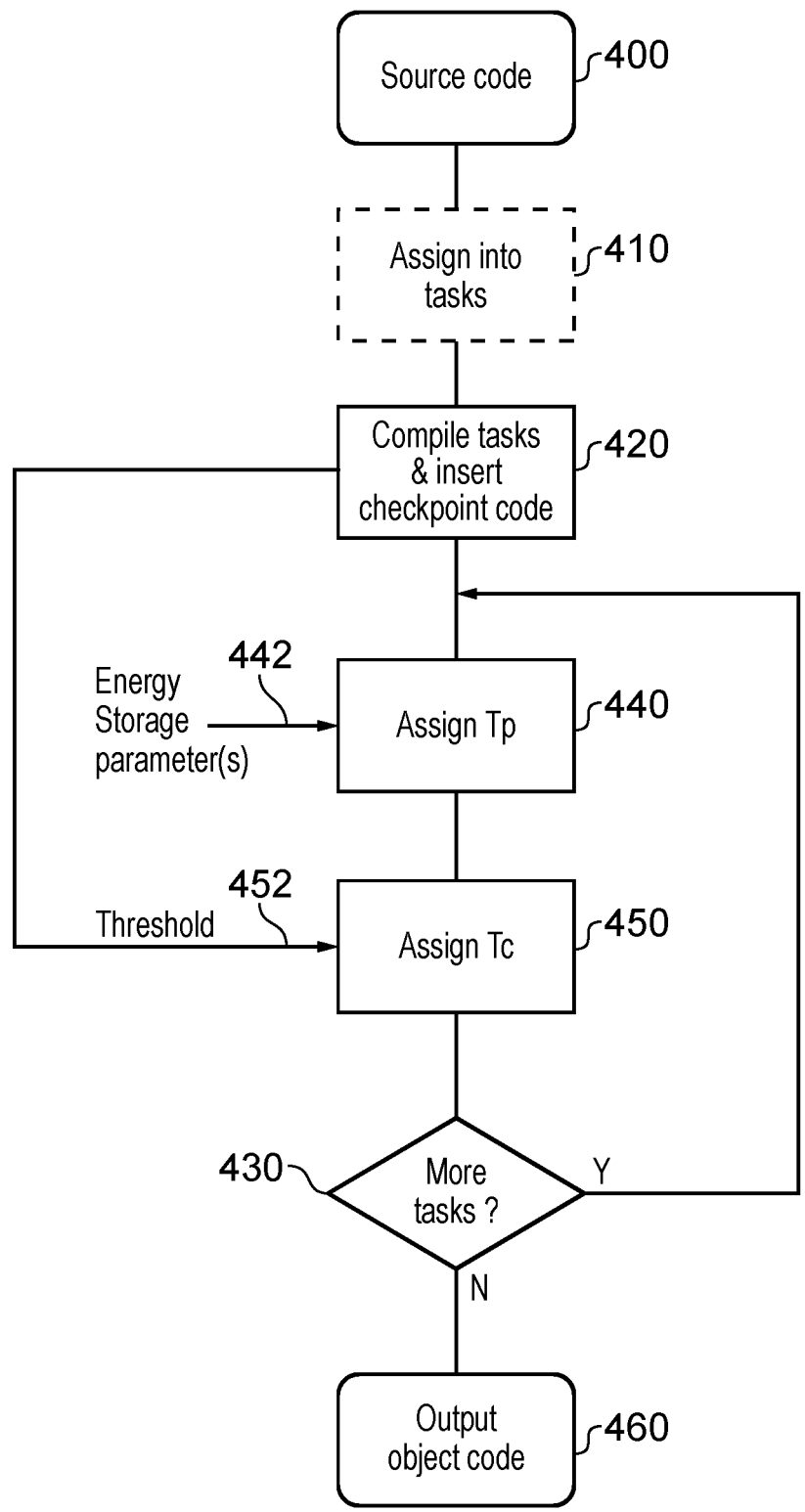
FIG. 4 is a schematic flowchart illustrating a method.

FIG. 4 is a schematic flowchart illustrating a method of generating computer software or object code for execution by the processor 145 of FIG. 1. The method illustrated by FIG. 4 is itself computer-implemented, for example by apparatus of the type to be discussed below with reference to FIG. 11.

The process starts with so-called source code 400 representing a computer program to be executed by the processor 145, for example to access the sensor 160 retrieve sensor outputs or data, process them in some way, and provide them to the communications interface circuitry 155.

At a step 410, the processing is assigned into one or more tasks which will ultimately be implemented as respective code portions as the type discussed above. The assignment into tasks can be performed on an arbitrary basis or can be performed by the compiler in response to, for example, generation within the process of a particular intermediate variable value.

At a step 420, the tasks are compiled into object code and checkpoint code 212, 222, 234, 232, 244 as described above is inserted at the start and end of at least some of the tasks.

Processing then continues for each of the tasks in turn, as controlled by a loop 430 which repeats steps 440, 450 once for each of the tasks. In this regard, note that the use of progress indicators would still be useful if there was only one code portion or task, but in the present example it is discussed in the context using multiple successive code portions each representing respective tasks.

For each of the code portions, at a step 440 the push-through indicator $T_p$ is assigned. The process to achieve this involves detecting, for example using cycle-accurate modelling of the object code relating to that code portion or by a trial execution (or using other techniques discussed below), how many cycles it will take to execute the code portion, subtracting from that total a parameter 442 indicating the number of cycles which can be performed using a reserve amount of electrical energy in the energy storage 170 once the energy condition has been detected, and setting a value of $T_p$ to be no less than (total number of cycles per code portion minus energy storage parameter). The parameter $T_p$ can be associated with the code portion in various ways, some of which will be discussed below.

Similarly, at the step 450, the progress indicator $T_c$ is assigned to the code portion based, for example, on a threshold indicator 452 representing for example a stage within execution of the code portion at which a particular milestone data value has been generated (and which may be provided by the compilation process at the step 420.

Once there are no more tasks at the step 430 to be executed, the result is output object code 460 for execution by the processor 145.

Possible Generation and/or Variation of $T_c$ and/or $T_p$ and/or Threshold Voltage Although in the example described above with reference to FIG. 4, the parameters or progress indicators $T_c$ and $T_p$ are set at the compilation stage, it is not a requirement of the present embodiments that they remain fixed for the entire life of the compiled code. For example, if the progress indicators $T_p$ and $T_c$ are associated with the compiled code portion, for example in header data or the like, they can be re-written or at least varied during the working life of the code portion. For example, the processor 145 in conjunction with the detector 175 could detect the actual energy decay characteristics of the energy storage 170, for example starting off triggering the energy condition conservatively so as to be sure that the stored energy will last the end of the number of cycles predicted to be provided by the reserve stored energy, but then vary the threshold and/or the position within the code portion indicated by $T_p$ in order to allow the push-through operation to encompass a larger proportion of the code portion, in other words moving $T_p$ to the left as drawn in FIG. 3.

In some examples, as discussed above, such a detection may involve either or both of detecting, during an instance of execution of the program code, the execution stage at which no more than a threshold remaining number of processing operations are required to complete execution of that code portion, and/or detecting a voltage decay characteristic of the energy storage device. The former arrangement allows the value of $T_p$ to be set or modified in response to running the code rather than at the compiling stage. Then, in response to the detection, the processor 145 or another device may generate and/or modify at least the first progress indicator for use in subsequent instances of execution of the program code. In some examples, the program code could be prepared (for example compiled) without a value of $T_p$ or with a predetermined, or dummy, or placeholder value such that at a first or other instance of execution of the program code a value is derived and stored as discussed above. This would avoid the need for cycle-accurate modelling at the compilation stage.

In other examples, it is possible for the processor 145 in conjunction with the detector 175 to vary the threshold voltage against which a detection is made in order to detect the energy condition. This could be performed, for example, in the context of a fixed $T_p$ so as to aim to make sure, given the current condition and decay characteristics of the energy storage device, that sufficient energy will remain to allow for execution of the remaining cycles defined by $T_p$. Therefore the comparing process (in order to detect the energy condition) could comprise simply comparing a prevailing output voltage of an energy storage device with a predetermined threshold voltage. Or it could comprise detecting a voltage decay characteristic of the energy storage device, generating a reference threshold voltage (for example, to aim to meet the requirement set out above), and comparing the prevailing output voltage of an energy storage device with the generated reference threshold voltage. Note that the generating of the reference voltage might be performed intermittently, for example once every 20 activations of the device (executions of the program code) as defined by an internal counter for example. In some examples, the threshold could initially be a predetermined value but could then be modified in response to a learned decay characteristic.

Trained machine learning systems may be employed in any of these arrangements.

Example Processor

Figure 5:
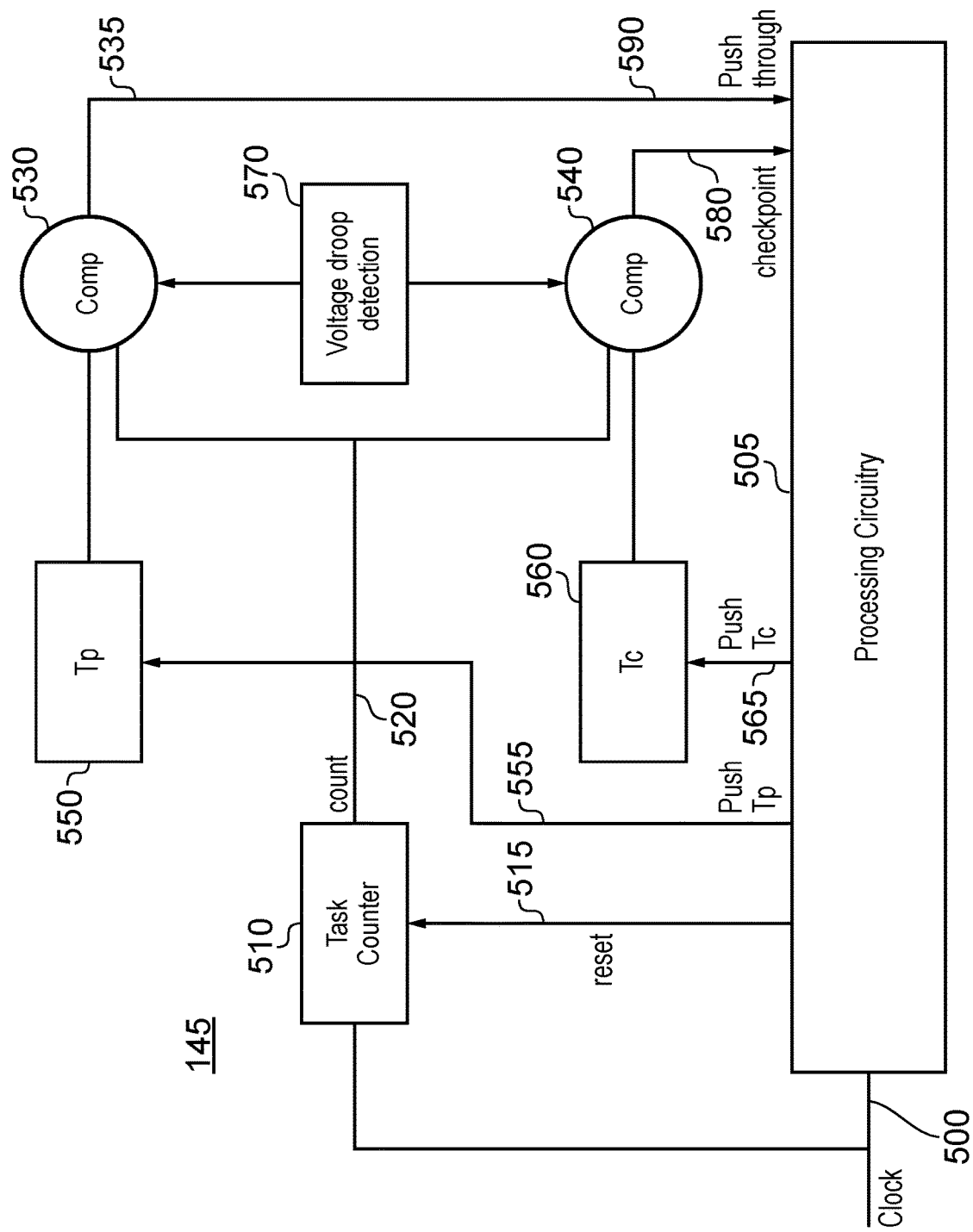
FIG. 5 schematically illustrates a processor.

FIG. 5 schematically illustrates an example of the processor 145 in connection with an example arrangement $T_p$ and/or $T_c$ are available through header data or the like associated with a code portion. The processor 145 is responsive to a clock signal 500 which controls operation of the processor 145 and which is also monitored by a task counter 510 which is reset 515 by the processor at the start of execution of the code portion. Therefore, the task counter 510 counts the number of cycles executed so far in connection with the current of prevailing code portion. The count 520 is provided to a pair of comparators 530, 540. These compare the count 520 with the values of $T_p$ 550 and $T_c$ stored in respective registers or memories and populated by values being pushed 555, 565 by the processor in response to initiation of execution of the current task. In these examples, $T_p$ and/or $T_c$ represents a respective execution stage within execution of that code portion as a number of processing operations (for example cycles) already executed during execution of that code portion.

The comparators 530, 540 are enabled for operation in response to voltage droop detection (in other words, the detection of the energy condition) 570. Note that the box 570 could be implemented by the detector 175 or could be triggered by the output 180 of the detector 175 or could be a separate detection.

Once the comparators 530, 540 are enabled, they compare the count 520 with corresponding count values (signifying or representing respective stages in execution of the current code portion or task) held by the values 550, 560.

When, as discussed above, the count 520 has reached at least the value represented by $T_c$ then a checkpoint signal 580 is asserted. If the count value 520 is detected to be at least as high as the value represented by $T_p$ 550 then a push through signal 590 is asserted. The processing circuitry 505 initiates:

A checkpointing operation if the signal 580 is asserted but the signal 590 is not asserted; or A continuation of execution, overruling the checkpoint operation, if both signals 580 and 590 are asserted; or A graceful termination of current processing with no checkpointing if neither of the signals 580, 590 is asserted.

Interrupt handling can be used either in response to the initial voltage droop detection or in response to one or both of the signals 580, 590 in order to prompt the handling of the voltage droop situation.

The processing circuitry cooperates with the task counter 510, the detector 570 and the comparators 530, 540 to provide the functionality of an energy condition detector 570 to detect an energy condition indicating that no more than a reserve quantity of electrical energy is available in the energy store; and control circuitry, responsive to a detection of the energy condition, the control circuitry comprising an execution stage detector to detect whether a current execution stage of the program code has reached at least the execution stage represented by the progress indicator; the control circuitry being configured, when the current execution stage of the program code is at least at the execution stage represented by the progress indicator, to control performance of a first operation; and when the current execution stage of the program code is before the execution stage represented by the progress indicator, to control performance of a second operation different to the first operation.

Figure 6:
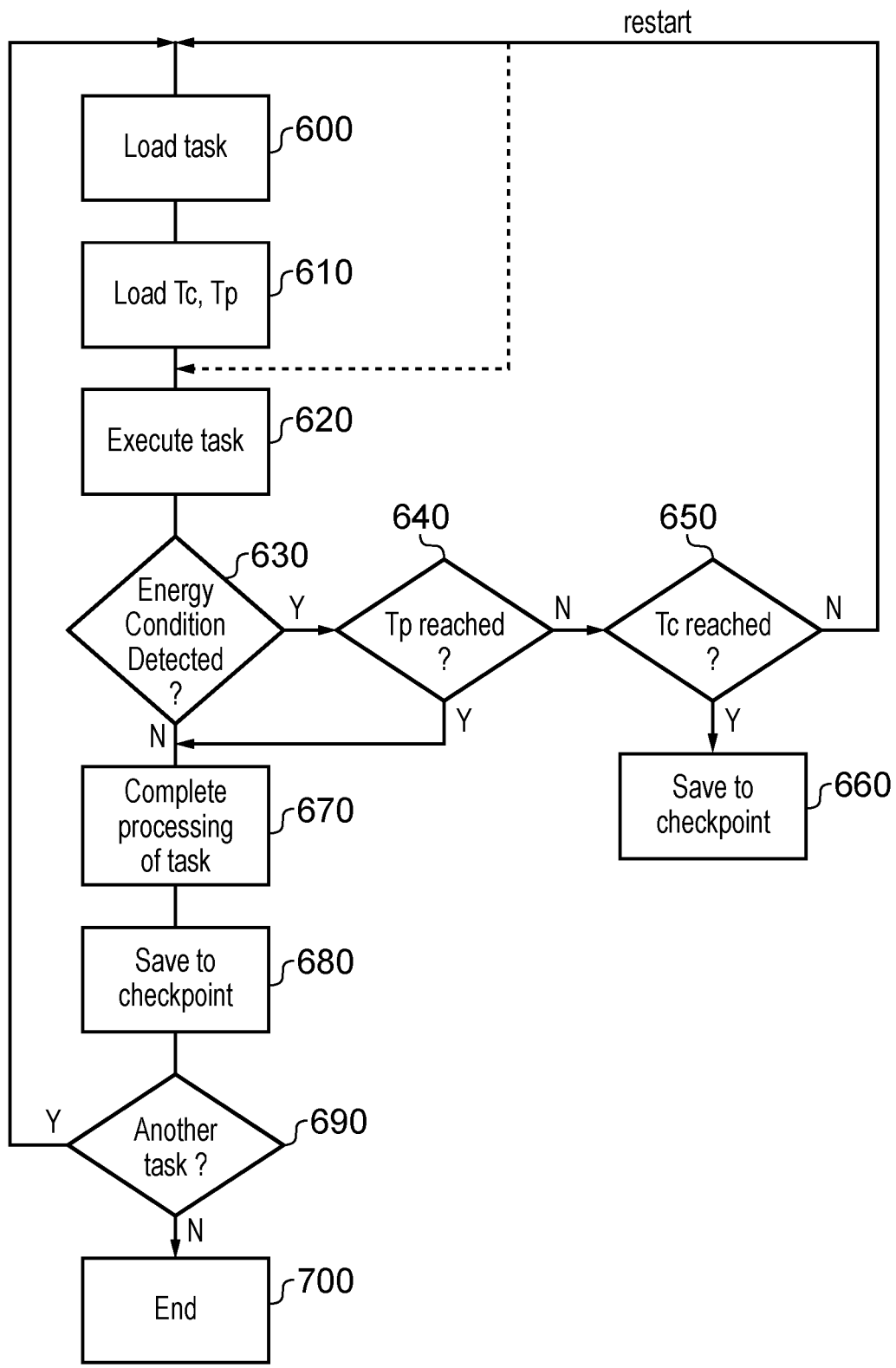
FIG. 6 is a schematic flowchart illustrating a method.

FIG. 6 is a schematic flowchart illustrating a method of operation of the arrangement of FIG. 5 in which, at a step 600, a current task or code portion is loaded into the memory 150 for execution (which may involve invoking checkpoint retrieval code as discussed with reference to FIG. 2) and, at a step 610 values of $T_c$ and $T_p$ associated with the code portion are also loaded, for example into the storage 550, 560 described above.

The task is executed at a step 620. If, during execution the energy condition is detected at a step 630 then control passes to a step 640. Here, it is detected, whether the threshold $T_p$ has been reached. If not, then control passes to a step 650 at which it is detected whether $T_c$ has been reached. If it has then the program is terminated with a save to and add space hoc checkpoint at a step 660. If not, then the program is restarted and control is returned either to the step 600 or alternatively to the step 620.

Returning to the negative outcome of the step 630 or the positive outcome of the step 640, control passes to a step 670 at which the processing of the task is simply completed and, if checkpointing is implemented, at a step 680 the code portion results are saved to a checkpoint using the checkpoint code provided at the end of the code portion.

If, at a step 690 another task remains to be executed control returns to the step 600. If not, the process ends 700.

Further Examples of the Use of Progress Indicators

Figure 7:
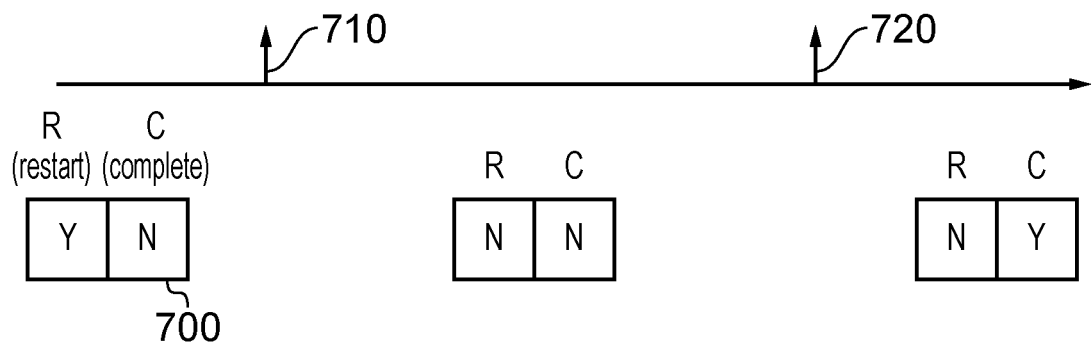
FIGS. 7 and 8 provide further schematic examples illustrating example progress indicators.

In other examples, such as that shown by FIG. 7, the processing circuitry 505 can maintain, for example, a pair of internal flags 700 which it modifies during execution of the task in response to the values of $T_p$ and $T_c$ and the number of cycles executed so far, for example, detected by the task counter 510 or similar. In the example of FIG. 7, these flags indicate whether or not the program should be restarted ("R") and whether or not the program should be completed ("C").

To start with, during a period of execution before a stage 710 represented by $T_c$ the R flag is set to yes and the C flag is set to no. Once the processor detects that the stage 710 has been passed, the R flag is set to no as is the C flag. Then, when a stage 720 is reached represented by $T_c$ the C flag is set by the processor to yes.

In the event of a detection of the energy condition at any time during execution, the processor receives an interrupt, for example, as the signal 180, and as part of the interrupt handling routine checks the R and C flags. If R is set then the code portion is restarted with no checkpointing. If neither R nor C is set then an ad hoc checkpointing process is performed and if C is set then the process is completed without checkpointing.

Figure 8:
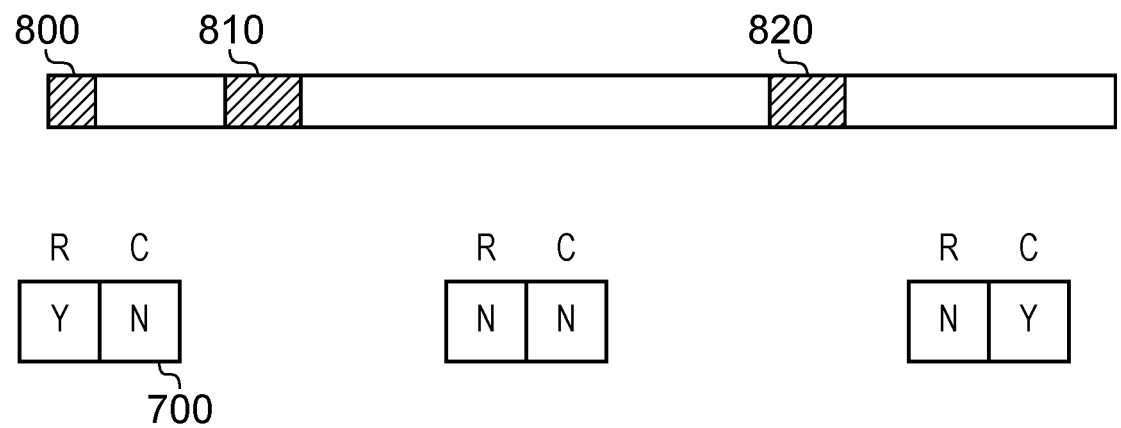

Referring to FIG. 8, as an alternative to providing the flags or indicators $T_p$ and $T_c$ as header or associated data, code portions 800, 810 can be inserted by the compiler within the code for execution, so that the portion 800 sets the R and C flags as described above, the code portion 810 changes them to no/no and the code portion 820 changes them to no/yes. In this way, the execution stage within the overall code portion defined by $T_p$ and $T_c$ is established by the location within the overall code portion of the sections 810, 820.

Summary Methods

Figure 9:
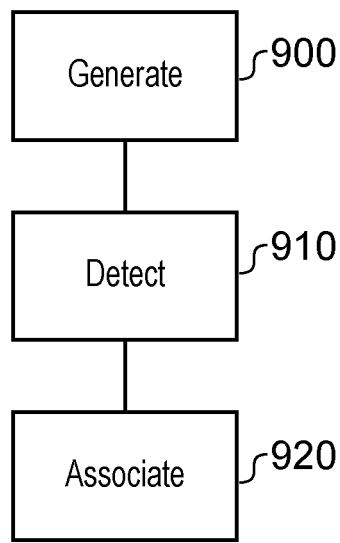
FIGS. 9 and 10 are schematic flowcharts illustrating respective methods.

FIG. 9 is a schematic flowchart illustrating a computer-implemented method comprising:

generating (at a step 900) computer executable code as one or more code portions;

detecting (at a step 910) a number of processing operations required to reach one or more predetermined stages in execution of each code portion; and associating (at a step 920) with each code portion one or more progress indicators, each representing a respective execution stage of the one or more predetermined stages within execution of that code portion.

Figure 10:
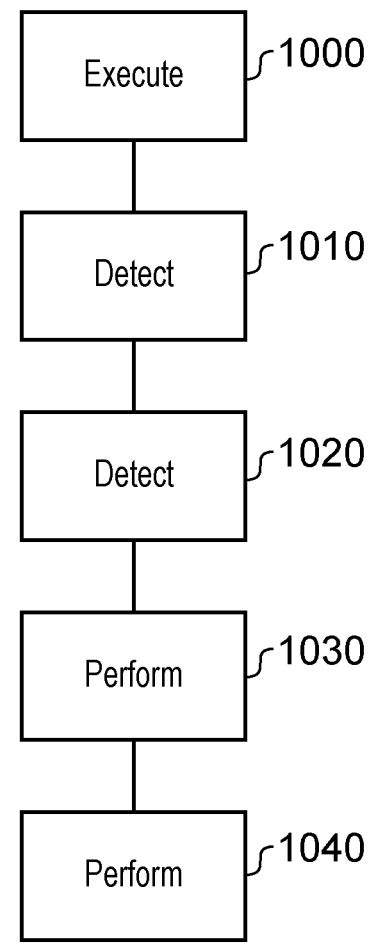

FIG. 10 is a schematic flowchart illustrating a method comprising:

executing (at a step 1000) program code having at least one associated progress indicator, each representing a respective execution stage within execution of that code portion;

detecting (at a step 1010) an energy condition indicating that no more than a reserve quantity of electrical energy is available to a processor configured to execute the program code;

when the energy condition is detected:
  detecting (at a step 1020) whether the execution of the program code has reached at least the execution stage represented by the progress indicator;
  when a current execution stage of the program code is at least at the execution stage represented by the progress indicator, performing (at a step 1030) a first operation; and
  when the current execution stage of the program code is before the execution stage represented by the progress indicator, performing (at a step 1040) a second operation different to the first operation.

Example Data Processing Apparatus

Figure 11:
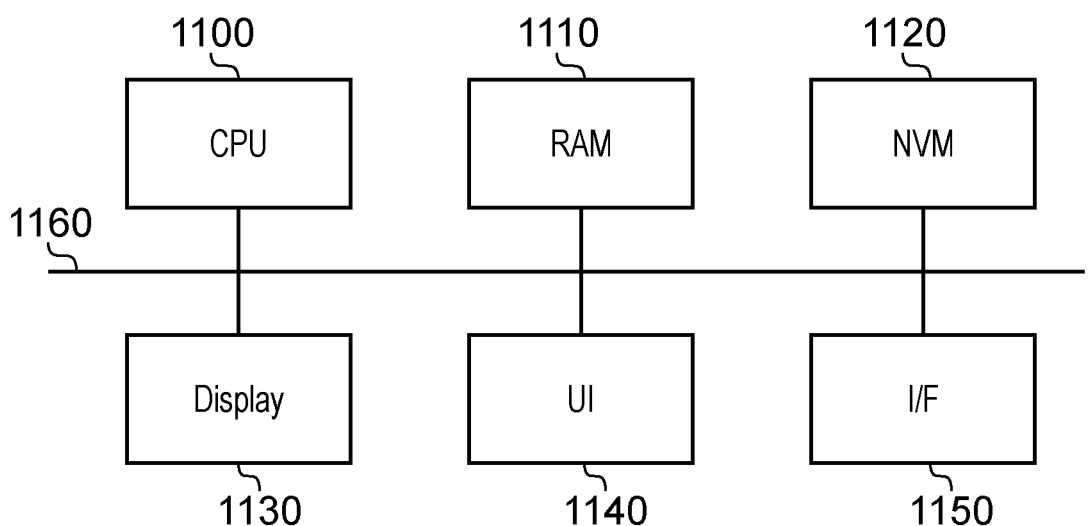
FIG. 11 schematically illustrates a data processing apparatus.

Finally, FIG. 11 schematically represents data processing apparatus by which the compilation process of FIG. 4 may be executed. In FIG. 11, a processing unit 1100 (CPU) executes program code, for example to perform a compilation process as described above, from random access memory (RAM) 1110, the program being stored in non-volatile memory (NVM) 1120 such as a magnetic or optical list or any other non-volatile memory such as read only memory or flash memory. A display 1130 may be provided along with user interface controls 1140 such as a keyboard and/or mouse, an interface, for example to a network 1150 may also be provided, with all of the components being interconnected by a bus arrangement 1160.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A method comprising:
   executing program code as one or more code portions, each code portion having at least one associated progress indicator, each representing a respective execution stage within execution of that code portion;

detecting an energy condition indicating that no more than a reserve quantity of electrical energy is available to a processor configured to execute the program code;

based on the energy condition being detected:

detecting whether the execution of a code portion has reached at least the execution stage represented by a push-through progress indicator of the at least one associated progress indicator associated with the code portion, the push-through progress indicator representing an execution stage at which no more than a threshold remaining number of processing operations are required to complete execution of the code portion;

based on a current execution stage of the program code being at least at the execution stage represented by the progress indicator, performing a first operation comprising continuing execution of the code portion using the reserve quantity of electrical energy; and, based on the current execution stage of the program code being before the execution stage represented by the progress indicator, performing a second operation different from the first operation.

2. The method of claim 1, in which:

the program code has two or more associated progress indicators including the push-through progress indicator and a checkpoint progress indicator;

the second progress indicator represents a further execution stage within execution of the program code;

when the current execution stage of the program code is at least at the further execution stage, the second operation comprises saving a current state, and when the current execution stage of the program code is before the further execution stage, the second operation comprises terminating execution of the program code.

3. The method of claim 1, in which the step of detecting an energy condition comprises one or more selected from the list consisting of:

comparing a prevailing output voltage of an energy storage device with a predetermined threshold voltage; and, detecting a voltage decay characteristic of the energy storage device, generating a reference threshold voltage, and comparing the prevailing output voltage of an energy storage device with the generated reference threshold voltage.

4. The method of claim 1, comprising:

detecting, during an instance of execution of the program code, the execution stage at which no more than a threshold remaining number of processing operations are required to complete execution of that code portion, and/or detecting a voltage decay characteristic of the energy storage device; and, in response to the detection, generating and/or modifying at least the push-through progress indicator for use in subsequent instances of execution of the program code.

5. An apparatus comprising:

a processor including processing circuitry configured to execute program code as one or more code portions, each code portion having one or more associated progress indicators, each representing a respective execution stage within execution of that code portion;

an energy store configured to provide operating power to the processor;

an energy condition detector configured to detect an energy condition indicating that no more than a reserve quantity of electrical energy is available in the energy store;

control circuitry, responsive to a detection of the energy condition, the control circuitry comprising an execution stage detector configured to detect whether a current execution stage of the program code has reached at least the execution stage represented by the progress indicator;

the control circuitry being configured, when the current execution stage of the program code is at least at the execution stage represented by a push-through progress indicator of the at least one progress indicator associated with the code portion, the push-through progress indicator representing an execution stage at which no more than a threshold remaining number of processing operations are required to complete execution of the code portion, to control performance of a first operation comprising continuing execution of the code portion using the reserve quantity of electrical energy; and when the current execution stage of the program code is before the execution stage represented by the push-through progress indicator, to control performance of a second operation different from the first operation.

6. The apparatus of claim 5, comprising energy harvesting apparatus configured to provide electrical energy to the energy store, in which the energy harvesting apparatus comprises one or more selected from the list consisting of:

(i) induction circuitry configured to receive electrical energy from an external induction apparatus;

(ii) vibrational generator circuitry configured to generate electrical energy from mechanical vibrations of at least the vibrational generator circuitry;

(iii) thermal generator circuitry configured to generate electrical energy from a temperature gradient associated with at least the thermal generator circuitry; and (iv) solar generator circuitry configured to generate electrical energy from light incident on at least the solar generator circuitry.

7. The apparatus of claim 5, in which:

the program code has two or more associated progress indicators including the push-through progress indicator and a checkpoint progress indicator;

a second progress indicator of the two or more progress indicators represents a further execution stage within execution of the program code;

when the current execution stage of the program code is at least at the further execution stage, the second operation comprises saving a current state, and when the current execution stage of the program code is before the further execution stage, the second operation comprises terminating execution of the program code.

8. The apparatus of claim 5, in which the program code comprises a respective code portion of a set of two or more code portions, in which:

a final processing stage of at least some of the code portions comprises checkpoint data storage code configured to store at least one or more data values generated by that code portion; and, an initial processing stage of at least some of the code portions comprises checkpoint data retrieval code configured to retrieve at least one or more data values generated by a preceding code portion.

9. The apparatus of claim 5, comprising:

one or more sensors configured to provide input data for processing by the processor using the program code; and, communication circuitry configured to communicate an output of the execution of the program code by the processor to external apparatus.

* * * * *